United States Patent
Orbach et al.

[19]

[11] Patent Number: 5,810,095
[45] Date of Patent: Sep. 22, 1998

[54] SYSTEM FOR CONTROLLING THE POSITION OF AN IMPLEMENT ATTACHED TO A WORK VEHICLE

[75] Inventors: Abraham Orbach, Naperville; William L. Schubert, Downers Grove, both of Ill.

[73] Assignee: Case Corporation, Racine, Wis.

[21] Appl. No.: 685,817

[22] Filed: Jul. 25, 1996

[51] Int. Cl.⁶ .................................................. A01B 41/06
[52] U.S. Cl. ................................................. 172/2; 701/50
[58] Field of Search ................................. 172/2, 3, 4, 4.5, 172/7, 8, 9–12; 364/424.07, 426; 701/50, 90

[56] References Cited

U.S. PATENT DOCUMENTS

| | | | |
|---|---|---|---|
| 4,176,337 | 11/1979 | Aechter et al. | 367/131 |
| 4,414,630 | 11/1983 | Harris et al. | 364/426 |
| 4,521,856 | 6/1985 | Phelps et al. | 364/426 |
| 5,261,495 | 11/1993 | Szymczak | 172/4 X |
| 5,320,186 | 6/1994 | Strosser at al. | 172/8 |
| 5,339,906 | 8/1994 | Fox et al. | 172/4 |
| 5,421,416 | 6/1995 | Orbach et al. | 172/4 |
| 5,469,921 | 11/1995 | Orbach et al. | 172/4 |
| 5,472,056 | 12/1995 | Orbach | 172/2 |
| 5,538,084 | 7/1996 | Nakayama et al. | 172/2 X |
| 5,549,166 | 8/1996 | Orbach et al. | 172/4 |

*Primary Examiner*—Terry Lee Melius
*Assistant Examiner*—Victor Batson
*Attorney, Agent, or Firm*—Foley & Lardner

[57] ABSTRACT

A system or method for controlling the position of an implement coupled to a work vehicle. The implement is moveable by a hydraulic positioning assembly including an actuator and a valve assembly which control the flow of fluid to the actuator in response to control signals. The valve assembly includes raise and lower valves, each valve requiring a control signal equal to a threshold value before the valve opens and fluid begins to flow. The system includes a sensor to detect the position of the implement and a control circuit. In response to a change in a position command, the control circuit applies a control signal to the appropriate raise or lower valve based upon the respective threshold value. The control signal may include a component for moving the implement at a desired rate of movement. After undesirable implement movement is detected, the control circuit modifies the threshold value. The modification may occur when the control circuit detects that the implement is moving at an excessive rate due to the effects of valve hysteresis and implement weight. The control circuit may detect the undesirable movement by determining that the position error value is more negative than a predetermined value.

22 Claims, 8 Drawing Sheets

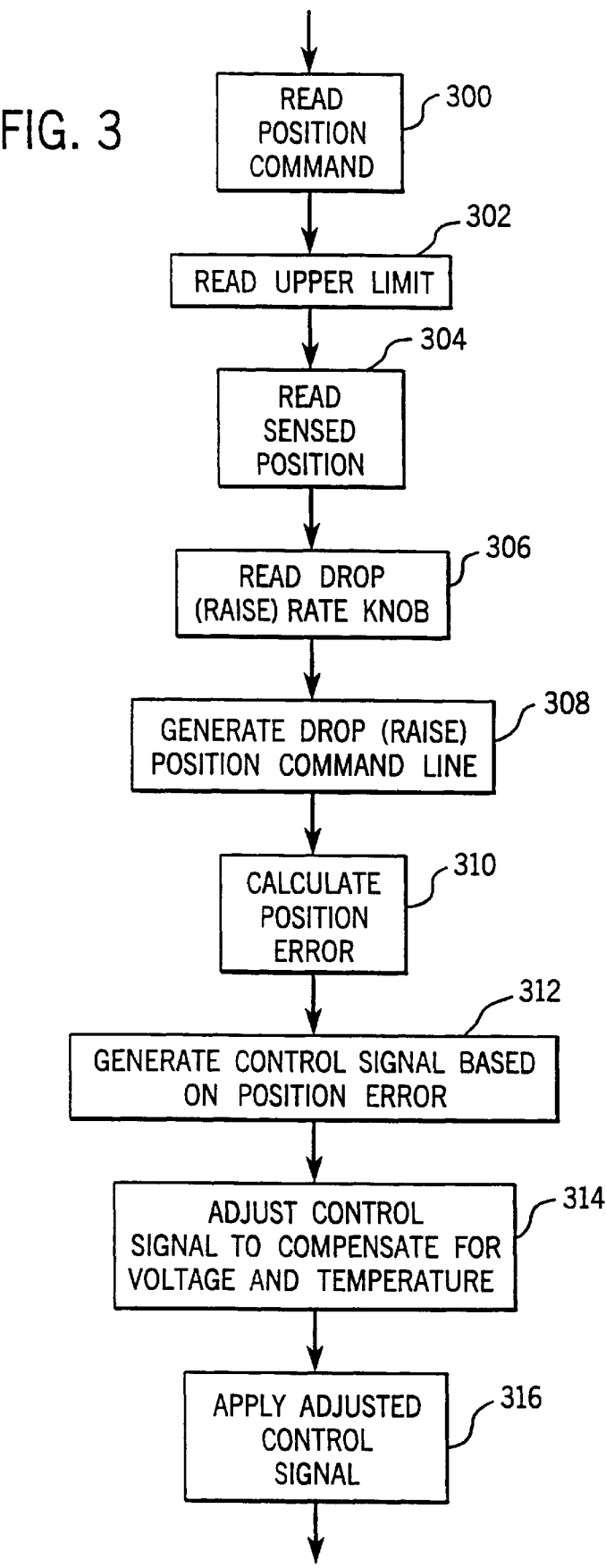

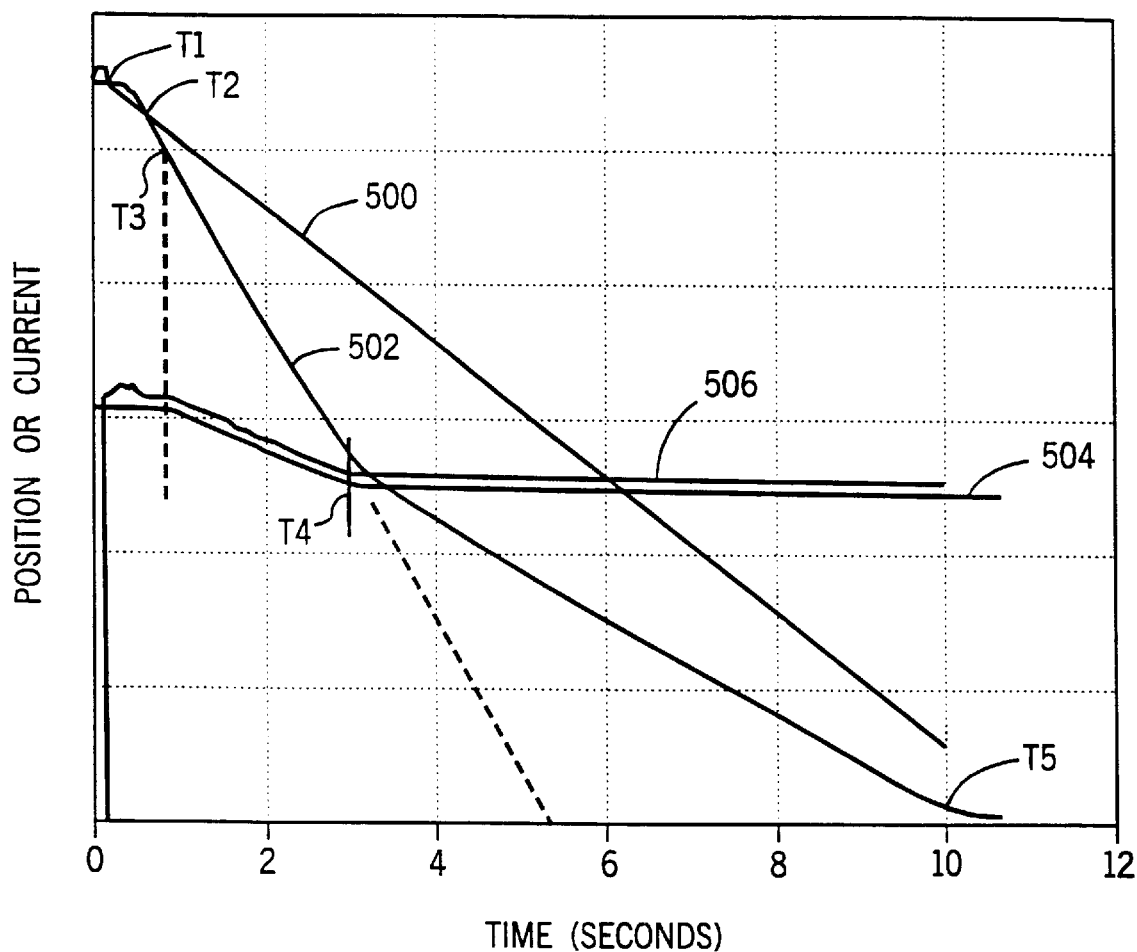

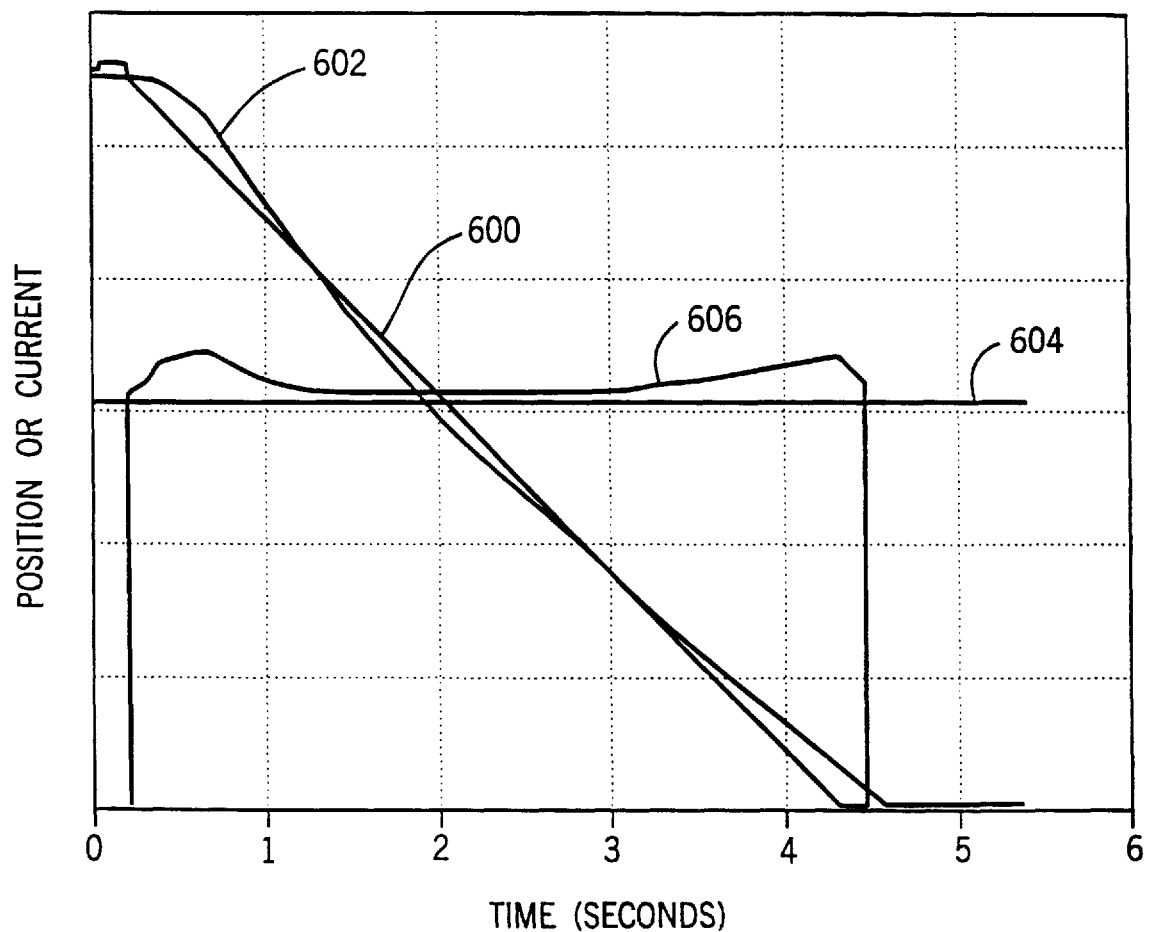

SYSTEM FOR CONTROLLING THE POSITION OF AN IMPLEMENT ATTACHED TO A WORK VEHICLE

FIELD OF THE INVENTION

The present invention generally relates to the field of control systems for work vehicles. More particularly, the invention relates to a system and a method for controlling the position of an implement moveable by a positioning assembly including an actuator and a valve assembly which controls the flow of fluid to the actuator, wherein the system applies control signals to the valve assembly based upon a threshold value to start implement movement, and then modifies the threshold value after detecting undesirable implement movement.

BACKGROUND OF THE INVENTION

A number of known control arrangements regulate the position or elevation of implements, such as plows, attached to or drawn by agricultural vehicles, such as tractors. Such control systems generally sense the position of a three-point hitch or other implement support structure and compare this position to a command value set by an operator using a command device. Based upon this comparison, such control systems generate control signals applied to valves which control the flow of hydraulic fluid to and from an actuator configured to vertically move the hitch, along with the implement mounted on it, to the desired elevation.

The hydraulic valves, which may include a raise valve and a lower valve or a three-position directional control valve, are typically solenoid-operated valves which include electrical coils. The coils operate the valves in response to electrical control signals generated by a control system. The control signals may include pulse-width-modulated (PWM) signals applied to drivers such that the rate of movement of the actuator is proportional to the duty cycle of the control signals. Typically, however, the control signal applied to each valve includes a threshold component designed to overcome inherent deadband in the valve and fluid flow forces within the valve, such as forces created by friction or springs, in order to open the valve and allow fluid to begin to flow through the valve. Thus, the control signal applied to the valve includes both a threshold component to open the valve and a component representing the desired drop or raise rate of the valve.

The threshold value for each valve may be determined during a calibration sequence in which the control signal is continuously increased until movement of the implement is detected. The minimum PWM signal which causes movement of the implement is the threshold value. The threshold value may be determined separately for the raise and lower valves. A calibration sequence to determine the raise and lower threshold values, and a control system such as that described above, is disclosed in U.S. Pat. No. 5,472,056, commonly assigned with the present invention and incorporated herein by reference.

Known control systems, however, may experience a problem which causes the implement to drop or raise in an undesirable manner, with a rate of movement exceeding a desired rate. The problem may be particularly troublesome when a heavy implement is commanded to drop at a slow drop rate. The problem may also occur when a at a slow drop rate. The problem may also occur when a light implement is commanded to raise at a slow rate.

The problem occurs because of valve hysteresis and the effect of implement weight on the movement rate. For example, assume a heavy implement is commanded to drop at a slow drop rate. To start implement movement, a control signal including both a threshold component and a desired drop rate component is applied to the lower valve. However, once the valve opens and the implement begins to move, the rate of descent may increase beyond the desired drop rate since the descent rate depends upon the weight of the implement. While the system can attempt to slow the drop rate by minimizing the drop rate component of the control signal, the control signal cannot become smaller than the valve's threshold value. Due to valve hysteresis, reducing the control signal to the threshold value may be insufficient to limit the flow through the valve and slow the rate of descent. Thus, the implement drops in an undesirable manner. The problem cannot be solved by decreasing the control signal to completely shut off the fluid flow through the valve since this would cause the implement to abruptly stop, thereby causing a jolt to the operator. Stopping the implement movement may cause an error between the sensed and commanded position which would then cause movement to restart, resulting in a start-stop cycle of implement movement.

SUMMARY OF THE INVENTION

Accordingly, the present invention provides an improved system and method for smoothly controlling the position of an implement. The invention also provides a system and a method for controlling implement position which corrects for the effects of valve hysteresis. The invention also provides a system and a method which adjusts the threshold control signal applied to a valve when the threshold value causes undesirable movement.

In accordance with one aspect, the invention relates to a system for controlling the position of an implement coupled to a work vehicle. The implement is moveable by a hydraulic positioning assembly comprising an actuator and a valve assembly configured to control the flow of fluid to and from the actuator in response to control signals, the valve assembly requiring control signals substantially equal to a first threshold value before fluid begins to flow. The system includes a sensor configured to detect the position of the implement and to generate a signal representative thereof, and a control circuit coupled to the sensor and the valve assembly. The control circuit is configured to generate the control signals applied to the valve assembly based upon the first threshold value in response to a change in a position command signal and, after detecting undesirable implement movement based at least upon the sensed position signal, to generate the control signals based upon a modified threshold value.

In accordance with another aspect, the invention relates to a system for controlling the position of an implement coupled to a work vehicle. The implement is moveable by a hydraulic positioning assembly comprising an actuator and a valve assembly configured to control the flow of fluid to and from the actuator in response to control signals, the valve assembly requiring control signals substantially equal to a first threshold value before fluid begins to flow. The system includes a sensor configured to detect the position of the implement and to generate a signal representative thereof, an operator-adjustable command device configured to generate a position command signal, and a control circuit coupled to the sensor, the command device, and the valve assembly. The control circuit is configured to determine an error value based upon the difference between the commanded position and the sensed position, to generate the control signals applied to the valve assembly based upon the first threshold value in response to a positive error value, and, if the error value becomes more negative than a predetermined value, to generate the control signals based upon a variable threshold value which is decreased until the magnitude of the error value no longer increases.

The invention also relates to a method for controlling the position of an implement coupled to a work vehicle. The implement is moveable by a hydraulic positioning assembly comprising an actuator and a valve assembly configured to control the flow of fluid to and from the actuator in response to control signals. The valve assembly requires control signals substantially equal to a first threshold value before fluid begins to flow. The method includes the steps of (a) generating the control signals applied to the valve assembly based upon the first threshold value in response to a change in a commanded position, (b) detecting undesirable implement movement, and (c) upon detecting undesirable implement movement, modifying the threshold value used to generate the control signal until control is achieved.

BRIEF DESCRIPTION OF THE DRAWINGS

The invention will become more fully understood from the following detailed description, taken in conjunction with the accompanying drawings, wherein like reference numerals refer to like parts, in which:

FIG. 3 is a flow chart generally representing typical control logic used to control the position of the implement in response to a position command signal.

FIG. 5 is a graph generally representing the operation of the control system described herein which shows the modification of the threshold value in response to undesirable implement movement.

FIG. 6 is a graph generally representing the operation of the control system described herein under conditions which do not trigger the logic which modifies the threshold value.

DETAILED DESCRIPTION OF THE PREFERRED EMBODIMENT

Before proceeding to the Detailed Description of the Preferred Embodiments, several general comments can be made about the applicability and the scope of the invention. First, while reference is made throughout the following discussion to a tractor having a hitch assembly on which an implement is mounted, it should be understood that the present system is more generally applicable to control systems for work vehicles in general. Thus, a system employing the elements recited in the appended claims, though used with other types of vehicles and/or for performing other functions, is equally within the intended scope of the invention.

Figure 1A:
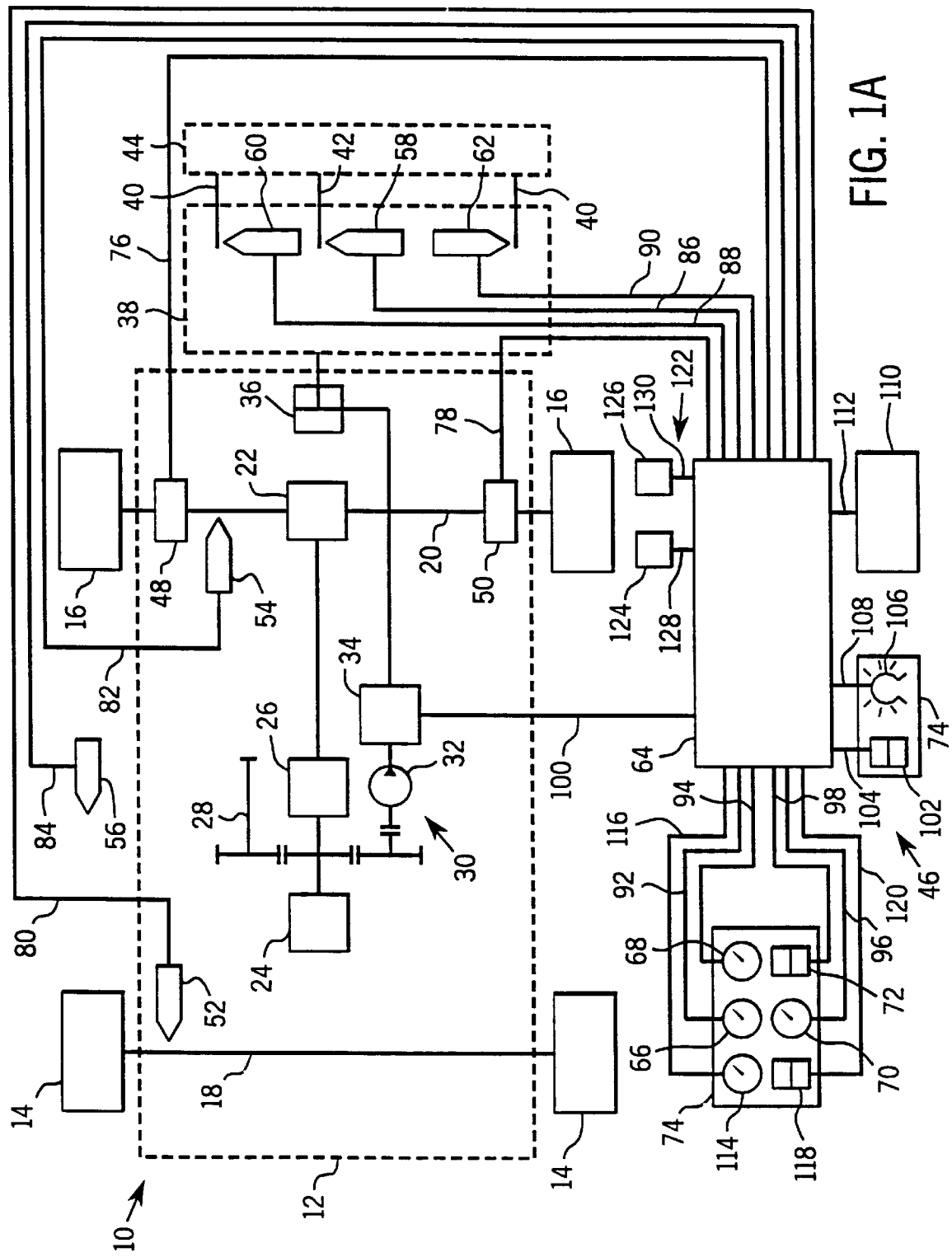
FIG. 1A is a diagrammatical representation of a tractor equipped with a control system for positioning an implement in response to a plurality of operating parameters including implement position and load.

Turning now to the FIGURES and referring first to FIG. 1A, a vehicle 10, such as an agricultural tractor, is illustrated diagrammatically as including a body 12 carried by front wheels 14 and rear wheels 16. Front wheels 14 are mounted in a conventional manner on an axle 18 and rear wheels 16 are mounted on a rear axle 20 coupled to a differential 22. Tractor 10 also includes a power plant or engine 24 coupled through a transmission 26 to differential 22 such that engine 24 may selectively drive rear wheels 16 in a number of forward and reverse gears. Tractor 10 typically includes auxiliary systems coupled to engine 24, such as a power take off shaft 28 for driving implements and other detachable equipment. A tractor generally of this type is further described in U.S. Pat. No. 5,421,416 incorporated herein by reference.

A hydraulic system 30 is coupled to engine 24 to provide a source of pressurized fluid for powering various actuators. As illustrated in FIG. 1A, hydraulic system 30 includes a hydraulic pump 32 piped to a fluid reservoir (not shown) and to a valve assembly 34 for regulating and directing pressurized fluid to various hydraulic components, such as a linear actuator, single-acting or double-acting cylinder 36 coupled to a hitch assembly 38. Hitch assembly 38 may be a conventional three-point hitch having lower and upper hitch links 40 and 42 for supporting a working implement 44, such as a plow. Moreover, valve assembly 34 preferably includes solenoid operated proportional valves for directing a flow of pressurized fluid to actuator 36 for raising and lowering hitch assembly 38 and implement 44 as commanded by an operator or control system as described below, such as to vary the penetration of implement 44 into ground being worked. Valve assembly 34 can also be used to raise hitch assembly 38, along with implement 44, to a lifted position wherein the implement is not engaged in a working position with the ground. A lifted position may typically be commanded by the operator or control system during travel of tractor 10 across a road or between fields.

As illustrated in FIG. 1A, tractor 10 is equipped with a control system, designated generally by the reference numeral 46 for controlling the position of hitch assembly 38 and implement 44. While control system 46 may include more or fewer of the elements shown in FIG. 1A, it may typically include brake sensors 48 and 50 coupled to the rear service brakes of tractor 10, speed sensors 52 and 54 coupled to the front and rear axles 18 and 20, respectively, a true ground speed sensor 56 (e.g., a radar-based speed sensor or non-powered wheel speed sensor in a 2-wheel drive tractor), a hitch position sensor 58 and draft load force sensors 60 and 62. Control system 46 also includes a control circuit 64 and command devices 66, 68, 70, 72, 102, 114 and 118 (described below) which may be provided on a single or multiple control consoles 74 in the tractor cab. Control system 46 also includes one or more devices to display status or parameter information to the operator, such as a lamp 106 and a display 110 (described below).

In operation, brake sensors 48 and 50 detect the application of the tractor service brakes and generate braking signals upon application of the brakes. These braking signals are applied to control circuit 64 via conductors 76 and 78, respectively, of course, for control systems employing control routines that do not make use of braking signals, sensors 48 and 50 may be omitted. Speed sensors 52 and 54, which may include a variable inductance magnetic pickup sensor, detect the rotational velocity of front wheels 14 and rear wheels 16, respectively, and generate signals representative thereof. These speed signals are transmitted to control circuit 64 via conductors 80 and 82. A tractor 10 may also include a ground speed sensor 56 to measure the true speed of tractor 10 with respect to the ground. Sensor 56 typically includes a radar device mounted to body 12 of tractor 10 which emits radar signals toward the ground and receives a portion of the signals rebounding from the ground to determine the ground speed. Sensor 56 then generates a speed signal representative of the tractor speed and transmits this signal to control circuit 64 via conductor 84. Alternatively, ground speed sensor 56 could include a receiver for receiving sequential signals from a satellite positioning system such as the Global Positioning System (GPS), with the ground speed equal to the change between sequential positions divided by the elapsed time. Speed sensor 52 could also be used to measure ground speed since it senses the rate of rotation of a non-driven front wheel 14 of tractor 10.

The signals produced by sensors 48 through 56 are used as inputs by control circuit 64 to regulate various functions of tractor 10 in accordance with preset, cyclical control routines. For instance, braking signals from sensors 48 and 50 may be used to control engagement and disengagement of a locking circuit for differential 22. Speed signals from sensors 52, 54 and 56 may be used to calculate a driven wheel slip value for use in controlling implement position. Moreover, other, additional sensors may be provided on tractor 10 for use in additional control routines. For example, such sensors might provide signals indicative of engine speed for use in regulating engine throttling or implement position as desired. Moreover, it should be understood that the various control functions required for operation of tractor 10, including the implement control functions discussed below, may be executed by a single control circuit 64 or by separate, dedicated control circuits taking as inputs only the parameter signals necessary for their precise function.

Control of the position of implement 44 is generally based upon information relating to the sensed implement position and draft load force. This information is provided via position sensor 58 and draft load sensors 60 and 62. Thus, position sensor 58, which is typically a rotary or linear potentiometer or linear variable differential transformer (LVDT) coupled to a linkage 42 of the tractor hitch assembly 38, detects the position or elevation of implement 44 with respect to body 12 and generates a position signal representative thereof. This position signal is conveyed to control circuit 64 via a conductor 86. Draft load sensors 60 and 62, which typically include resistance strain gauges applied to links 40 of hitch assembly 38, generate draft load signals representative of the force exerted on links 40. These draft load signals are transmitted to control circuit 64 via conductors 88 and 90, respectively. Thus, control circuit 64 receives signals representative of both the position of implement 44 and either the draft force generated by interaction of implement 44 with the ground or, when implement 44 is in a lifted position, the load exerted by implement 44 on links 40. When tractor 10 is stopped and implement 44 is in a lifted position, the load sensed by sensors 60 and 62 is related to the weight of the implement.

In addition to sensed values of the operating parameters discussed above, control circuit 64 receives command or reference values from command devices 66, 68, 70, 72, 114 and 118, which typically include switches and potentiometers positionable via suitable knobs or handles (not shown). For the purposes of implement position control, command device 66 provides an implement position command signal representative of the desired position of implement 44. Command device 68 provides a draft command value representative of the desired level of draft force on implement 44. Command device 70 is an operator-adjustable upper limit selector for setting the maximum allowable raised physical position of hitch assembly 38, hereinafter referred to as the upper limit, beyond which control system 46 may not move assembly 38. Command device 72 is an implement position override switch that includes an UP position, a DOWN position and a spring-biased momentary DOWN position accessible from the DOWN position. Command device 114 is an operator-adjustable drop rate device for setting a desired drop rate of actuator 36. Finally, command device 118 is an optional drop rate override switch that includes a first position in which control circuit 64 uses the drop rate set by command device 114, and a second position in which the drop rate may be overridden.

Although the foregoing command devices are preferred, a given control system may not use every command device described above, and other command devices may provide other inputs for control of various functions of tractor 10. For example, control system 46 may also include an operator-adjustable raise rate command device for setting a desired raise rate of actuator 36 independently of drop rate command device 114. The raise rate set by this command device could also be overridden by an optional override switch. The drop rate and raise rate command devices may be referred to as rate of movement devices. Control system 46 may also include a travel knob or response rate knob as described in U.S. Pat. No. 5,421,416, mentioned above.

Signals from devices 66, 68, 70, 72, 114 and 118 are applied to control circuit 64 via conductors 92, 94, 96, 98, 116 and 120, respectively. Based upon the command or reference values supplied by command devices 66, 68, 70, 72, 114 and 118, and upon the sensed values from sensors 48 through 62, control circuit 64 generates control signals for raising and lowering implement 44 and applies these control signals to valve assembly 34 via conductor 100 to move actuator 36.

In a control system equipped for slip control, control circuit 64 also receives a command from command device 102. Command device 102 is used for turning a slip control function on and off and for setting a slip limit. Command device 102 is preferably a three-position rocker switch selectively movable between OFF, ON and SET positions. The SET position of command device 102 is accessible from the ON position and is a momentary position maintained as long as the operator holds command device 102 in the SET position. A signal indicative of the position of command device 102 is applied to control circuit 64 via conductor 104. The slip control system also includes a slip indicator lamp 106. Lamp 106 is activated by a signal supplied by control circuit 64 via conductor 108 when a slip control override function is engaged to raise hitch assembly 38 to reduce wheel slip to a desired range.

Control system 46 may also include a display 110 controlled by control circuit 64 via conductor 112. Display 110 may be adapted to display various parameters in a manner known in the art.

Control system 46 also includes a remote switch assembly 122 for commanding elevational movements of hitch assembly 38. Remote switch assembly 122 preferably includes a pair of remote momentary switches 124 and 126 fender-mounted near the rear of tractor 10. Remote switches 124 and 126 are momentary UP and DOWN switches coupled to control circuit 64 via conductors 128 and 130, respectively. Switches 124 and 126 could be replaced with an appropriate single switch.

While in the foregoing description of control system 46 the various sensors and command devices are shown coupled directly to circuit 64, other system structures and architectures may be used. For example, control circuit 64 may be one of several peer, master or slave controllers provided on vehicle 10 for different subsystems, such as PTO operation, an operator's console, transmission operation and the like. In such cases, control circuit 64 may be coupled to other controllers via a communications databus and some or all of the sensors and command devices needed to carry out the functions of control circuit 64 may be assigned and interfaced directly with other controllers on the vehicle. The various parameter signals needed by control circuit 64 could be communicated to control circuit 64 via the communications databus and circuit 64 would include communications interface circuitry adapted to recognize and record necessary signals from the databus. Moreover, circuit 64 may be adapted to output control signals via the communications databus to be received by other system controllers such that the control functions are executed by such other system controllers.

Figure 1B:
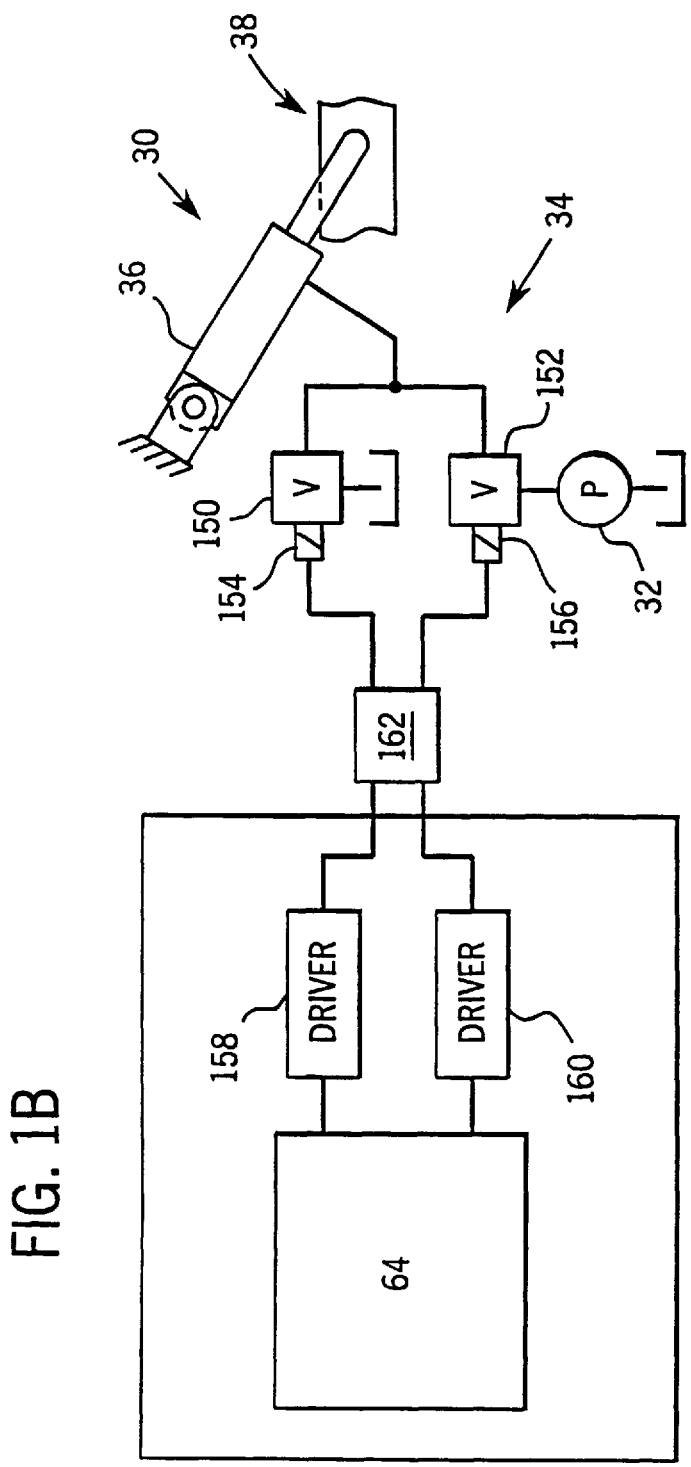
FIG. 1B is a diagrammatical representation of the hydraulic system shown generally in FIG. 1A.

Hydraulic system 30 is shown in detail in FIG. 1B. Cylinder 36 is operated in response to the operation of hydraulic valves 150 and 152 which control the flow of fluid to and from cylinder 36. Valve 150 is referred to as the raise valve and valve 152 is referred to as the lower valve. Alternatively, valves 150 and 152 can be embodied into a single valve. Valves 150 and 152 are preferably designed as solenoid-operated valves and each includes an electrical coil 154 and 156, respectively, which operate the respective valve in response to control signals generated by control circuit 64. Thus, coils 154 and 156 may be referred to as raise coil 154 and lower coil 156. However, other forms of electrically-driven mechanisms could be used to position implement 44.

Control circuit 64 provides control signals to a pair of valve drivers 158 and 160. Valve drivers 158 and 160 are connected to and control operation of valves 150 and 152, respectively, through a conventional relay 162. Preferably, each valve driver 158 and 160 is a conventional PWM current driver but other forms of drivers are known and could be used to operate valves 150 and 152 in the intended manner.

Figure 2:
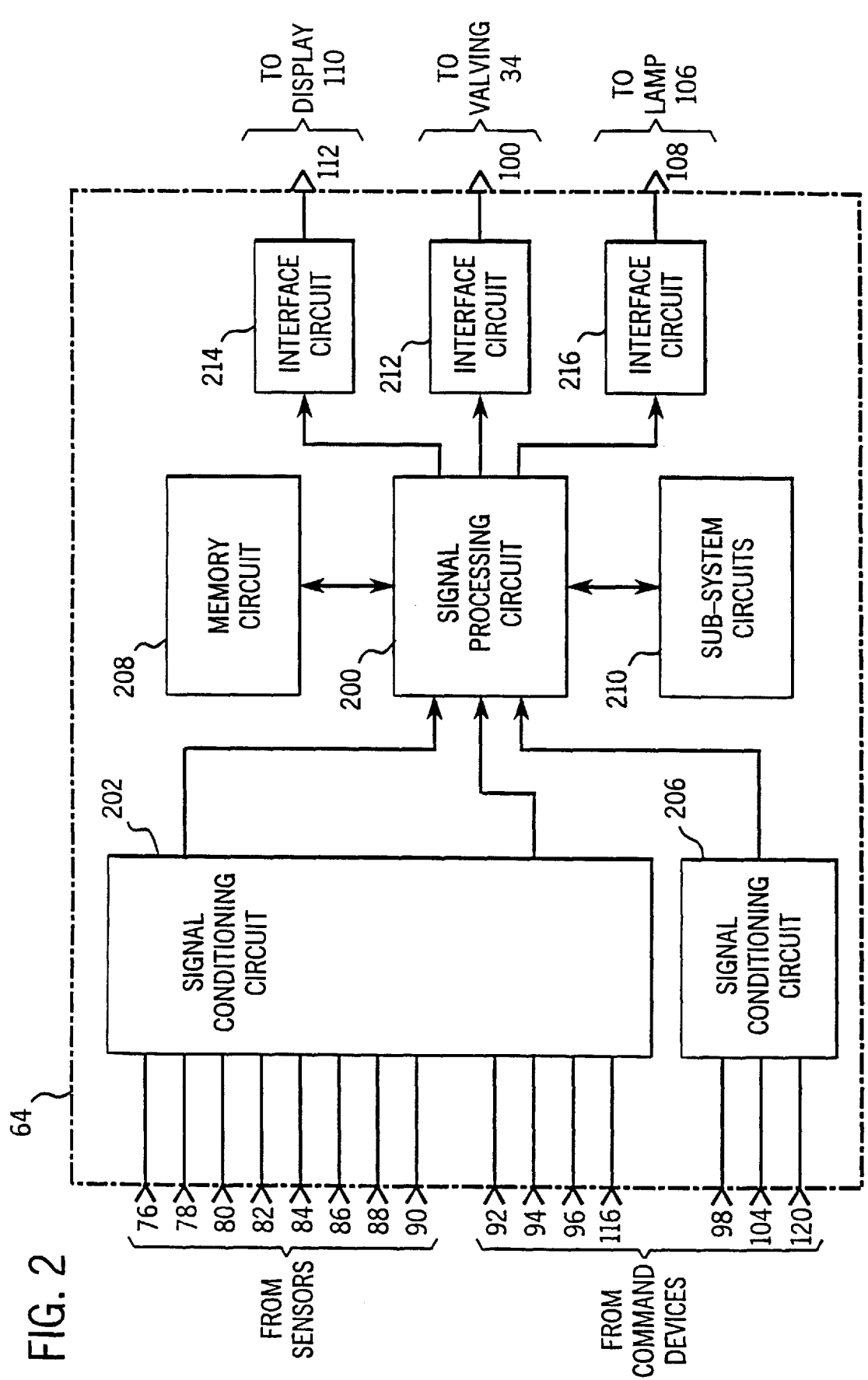
FIG. 2 is a block diagram illustrating certain of the principle circuits included in the controller for the system shown in FIG. 1A.

Certain of the sub-circuits included in control circuit 64 are illustrated diagrammatically in FIG. 2. Control circuit 64 includes a signal processing circuit 200 coupled to a number of other circuits including signal conditioning circuits 202 and 206, a memory circuit 208, one or more subsystem circuits 210 including circuits such as a response signal generating circuit or an initialization circuit, and output signal interface circuits 212, 214 and 216. While these various circuits are illustrated in FIG. 2 as separate, interconnected elements, it should be understood that all or some of these circuits may be included in a single integrated circuit and may comprise internal circuitry of an appropriately configured or programmed microprocessor.

Input signals transmitted from sensors and command devices to control circuit 64 via conductors 76 through 96 and 116 are applied to signal processing circuit 200 through signal conditioning circuit 202, which typically includes an analog-to-digital converter circuit and appropriate isolation, depending upon the type of sensors and command devices utilized and the nature of the signals produced. More than one analog-to-digital converter may be used to increase the conversion bandwidth. Circuit 202 receives the input signals from the sensors and command devices, produces digital signals or values representative of the various input signals and applies these values to signal processing circuit 200. Circuit 206 receives command input signals from other command devices via conductors 98, 104 and 120, which are generally discrete (e.g., on/off) signals for controlling operation of signal processing circuit 200. Circuit 206 typically includes a multiplexer and appropriate isolation, permitting signal processing circuit 200 to select and access signals applied to circuit 206.

Memory circuit 208, which may include several different memory modules, preferably includes both volatile and non-volatile memory, such as random access memory (RAM), electronically programmable read only memory (EPROM), electronically erasable programmable read only memory (EEPROM) and FLASH memory. The volatile memory of circuit 208 is generally used to store various parameter and intermediate values used during the control functions of signal processing circuit 200. Non-volatile memory, such as FLASH memory or EPROM, serves to store the cyclic control routine implemented by signal processing circuit 200, while other non-volatile memory, such as EEPROM, serves to store the calibration values and failure signals indicative of failure or non-responsiveness of system components.

Other subsystem circuits 210, such as a response signal generating circuit or an initialization circuit, may be included in the circuitry of signal processing circuit 200, but are illustrated separately here for explanatory purposes. The response signal generating circuit receives values representative of sensed implement position and sensed implement draft or load and generates a response signal to control the movement of implement 44. The response signal is applied to signal processing circuit 200 to adjust control signals generated by circuit 200. The adjusted control signals, in the form of pulse-width-modulated (PWM) output signals, are applied to output signal interface circuit 212. Circuit 212 includes appropriate valve drivers, such as drivers 158 and 160, for energizing the solenoids of valve assembly 34, thereby moving actuator 36 in a desired direction and at a desired rate. The rate of movement of actuator 36 is preferably proportional to the duty cycle of the control signals. The adjusted control signals produced by circuit 200 could have forms other than PWM signals and, where actuators other than hydraulic cylinders and the like are used for moving the implement, these control signals are adapted for the particular actuator used.

Circuit 200 also produces a control signal applied to interface circuit 216 which generates an output signal coupled to lamp 106 via conductor 108 to provide on/off control of lamp 106. In addition, circuit 200 produces a control signal applied to interface 214 which drives display 110 via conductor 112.

Generally, automatic control of the position or elevation of implement 44 is carried out as follows. Control circuit 64 monitors the command or reference values for implement position and draft force set by command devices 66 and 68, respectively. These values are filtered and compared to sensed position and draft force values read from sensors 58, 60 and 62 according to a cyclic control routine. A number of such routines, following a variety of control schemes, are known in the art and do not, in themselves, form part of the present invention. While different manufacturers may utilize different control routines, depending upon the type and class of vehicle being controlled and upon the parameters governing implement movement, these routines typically generate control signals for moving the implement up or down depending upon the deviation of the sensed values of at least the draft force and implement position from the reference values for these parameters. Moreover, these routines may select the greater of two or more parameter error values or combine two or more parameter error values to generate the implement control signals. Most known systems of this type ultimately generate control signals in the form of PWM signals, the duty cycle of which is proportional to the error signal forming the basis for control. These PWM signals are then applied, through an appropriate valve driver, to the solenoid coil of a proportional hydraulic valve to raise or lower the implement at a rate proportional to the PWM control signal duty cycle. A control system which executes a control routine such as the above is described in U.S. Pat. No. 5,421,416, incorporated herein by reference.

FIG. 3 generally represents the position control logic used to control the position of implement 44. At steps 300 through 306, control circuit 64 reads input values associated with the position control logic. These values include a position command from command device 66, an upper limit value from command device 70, a sensed position from position sensor 58 and a drop rate value set by the operator using command device 114. The position command and upper limit values set travel limits for the position of implement 44. At step 308, control circuit 64 generates a position command line with a slope based upon the drop rate value. In a preferred embodiment, control circuit 64 digitizes the analog drop rate output from command device 114 and categorizes the value into one of ten drop rate ranges, designated as drop rate categories "1" through "10". For example, drop rate category "1" corresponds to a slow declining slope (e.g., 12 seconds for hitch assembly 38 to drop completely) while drop rate category "10" corresponds to a steep declining slope. Similar logic may be used to generate a position command line with a slope based upon a raise rate value.

At step 310, a position error value is calculated based upon the difference between the sensed position and the position command line. At step 312, control circuit 64 generates a control signal for actuator 36 based upon the position error value and the threshold current value for the respective lower or raise valve being commanded. The control signal is adjusted at step 314 to compensate for changes in battery voltage or temperature from the values present when the control system was calibrated, as described in U.S. Pat. No. 5,472,056, incorporated herein by reference. At step 316, the corrected control signal is applied to actuator 36 to cause hitch assembly 38 to move elevationally at the desired rate.

Figure 4A:
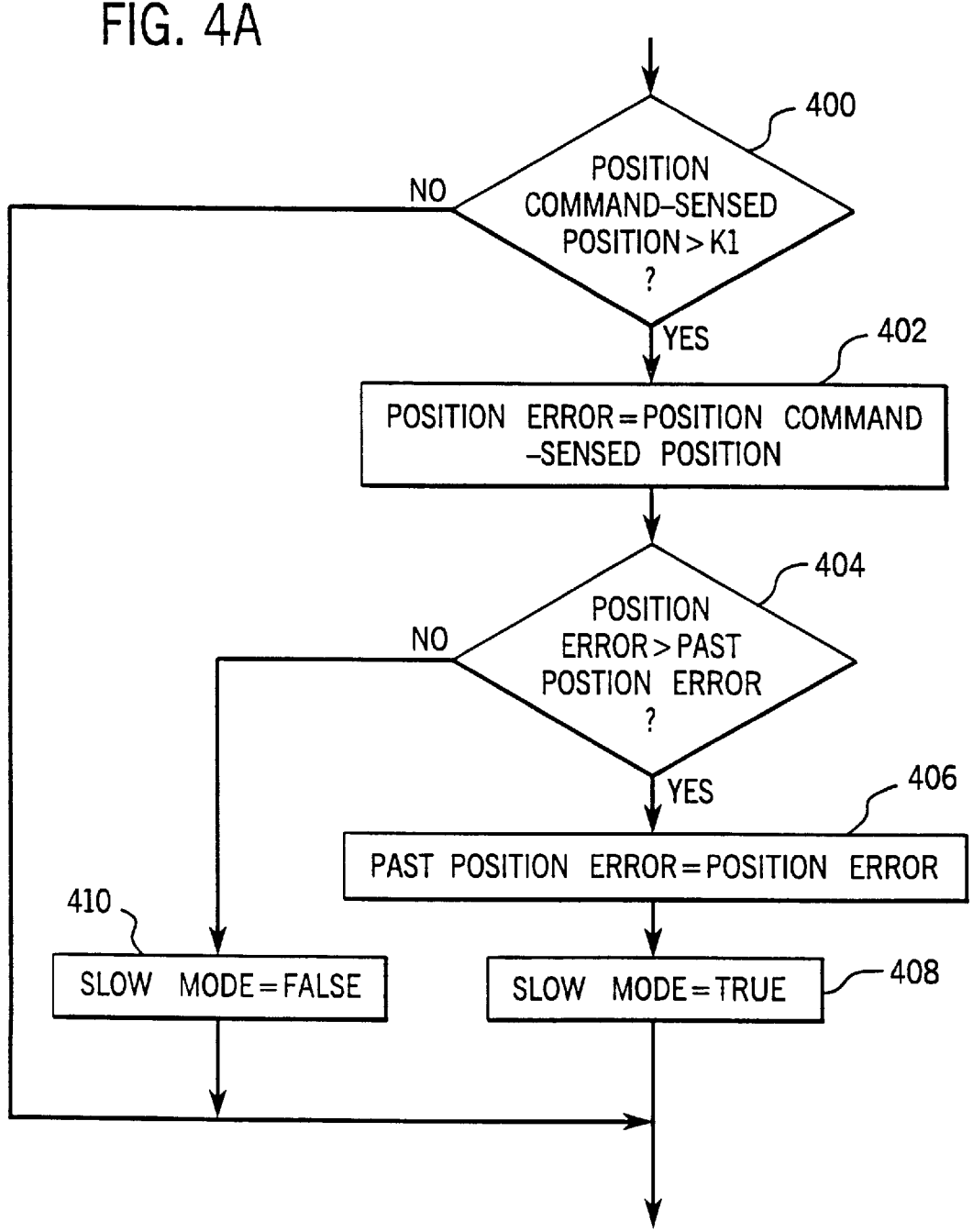
FIGS. 4A and 4B are flow charts generally representing typical control logic used to modify the threshold current applied to a valve in response to undesirable implement movement.
Figure 4B:
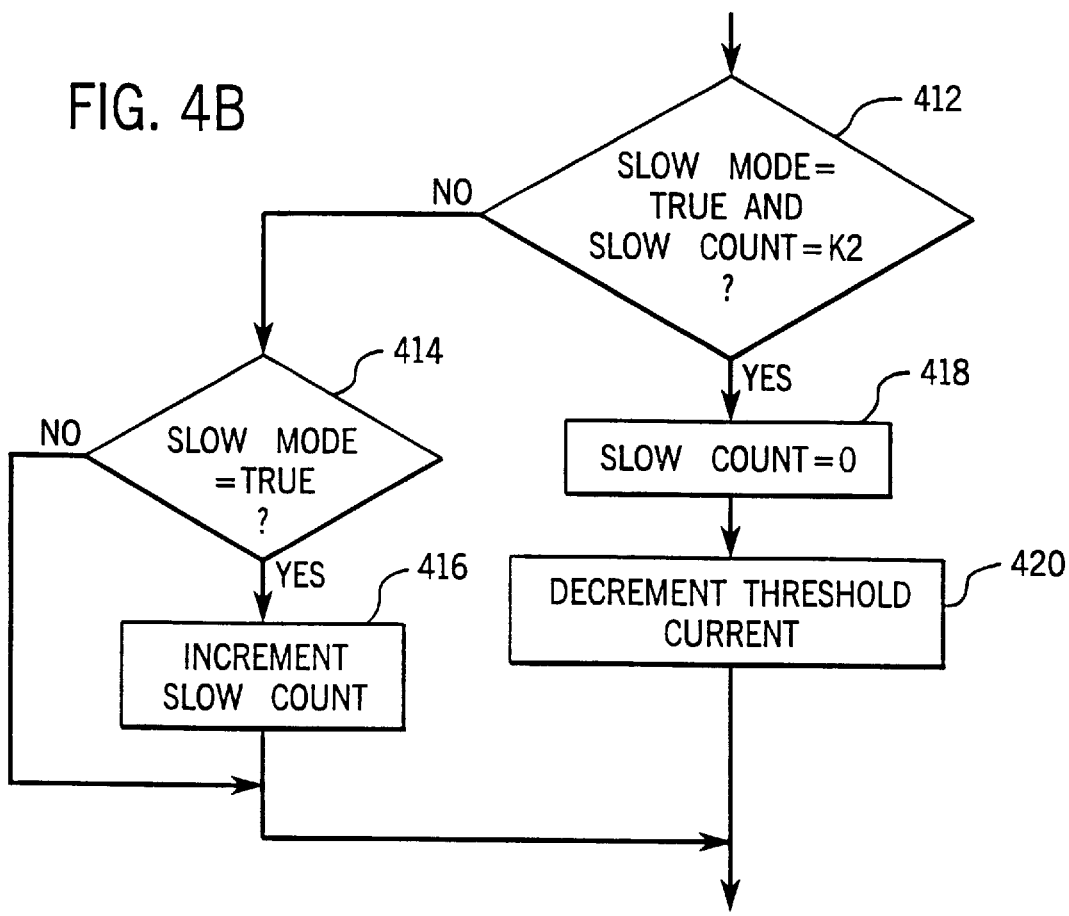

Referring to FIGS. 4A and 4B, the threshold current applied to valve assembly 34 is modified when implement 44 starts to move at an excessive rate due to the threshold current. As explained above, the excessive rate of movement occurs because the threshold current is too high to overcome the effects of the valve hysteresis. The logic shown in FIGS. 4A and 4B may be executed at different points during the cyclic control routine.

At step 400, control circuit 64 detects that implement 44 is moving in an undesirable manner when the position error value (i.e., the difference between the commanded position and the sensed position) is more negative than a certain value. This value may, for example, equal twice the deadband value used to detect a change in position command. A negative position error value corresponds to a sensed position below the position command when implement 44 is being lowered, and a sensed position above the position command when implement 44 is being raised. With a negative error value, the rate of movement of implement 44 cannot be slowed by decreasing the desired drop or raise rate component of the control signal since this component is already at its minimum value. Instead, the rate of movement is slowed by decreasing the threshold component as described below.

At step 402, control circuit 64 determines the position error by calculating the difference between the commanded position and sensed position. At step 404, control circuit 64 determines if the threshold value is too high to overcome the effects of valve hysteresis. In a preferred embodiment, control circuit 64 detects that the threshold current is too high based upon whether the position error increased since the last pass through the cyclic control routine. Alternatively, control circuit 64 could detect that the threshold current is too high based upon the rate of change of the sensed position signal. As shown at steps 406 and 408, if the magnitude of the position error increased (i.e., became more negative), the current position error is saved for use on the next pass through the cyclic control routine, and a flag (SLOW MODE) is set TRUE to indicate that the threshold current should be decreased in order to slow the rate of movement of implement 44. Otherwise, SLOW MODE is set FALSE at step 410.

Referring to FIG. 4B at steps 412 and 414, if SLOW MODE is FALSE, control circuit 64 takes no action affecting the threshold current. After SLOW MODE is set TRUE, control circuit 64 increments a counter or timer (SLOW COUNT) at step 416. Once a certain time period has elapsed (i.e., SLOW COUNT=K2), SLOW COUNT is cleared at step 418 and the threshold current is decremented at step 420. If the lower threshold current is still too high, SLOW MODE will remain TRUE and control circuit 64 will again increment SLOW COUNT at step 416 until the certain time period elapses again, at which point the threshold current will be modified again. In a preferred embodiment, constant K2 equals 1 such that the threshold current is modified on every other pass through the logic (i.e., every 20 msec). However, K2 may be increased to decrease the rate at which the threshold current is modified. This cycle continues until the magnitude of the position error no longer increases (i.e., no longer becomes more negative), indicating that the lower threshold current has decreased the flow of fluid through the commanded valve.

In a preferred embodiment, control circuit 64 reads the original threshold current for the valve being commanded from the memory location in which it is stored during a calibration sequence, and decrements the threshold current in steps of about 0.1% each time step 420 is executed. The original threshold value is reused the next time the slow mode logic is triggered.

The operation of control system 46 is discussed in relation to the graphs shown in FIGS. 5 and 6. FIG. 5 shows the operation of control system 46 in response to a relatively slow change in the commanded position while FIG. 6 shows the response to a relatively quick change.

Referring to FIG. 5, a line 500 represents the position command line generated when a heavy implement is commanded to drop at a slow rate. In this example, implement 44 is commanded to drop at a rate category of "1" corresponding to 12 seconds for full movement over the entire range of positions. The actual position of the hitch is shown by a line 502. The threshold current used to generate the control signal applied to the lower valve coil is represented by a line 504, and the actual current applied to the lower valve coil is represented by a line 506.

At time $T_1$, position command line 500 starts to slope downward as the operator adjusts command device 66. The slope of position command line 500 is determined by the setting of drop rate device 114. In response, control circuit 64 applies a control current signal to the lower valve (line 506) which includes a threshold component (the lower valve threshold determined during calibration) and a desired drop rate component. Implement movement begins as a positive error value (the difference between lines 500 and 502) builds up. Between times $T_1$ and $T_2$, implement 44 descends at a rate which increases due to the control signal and implement weight until the actual hitch position crosses the command line at time $T_2$, at which time the error is substantially zero and the lower current (line 506) is substantially equal to the threshold current (line 504). After time $T_2$, the position error becomes negative and the lower current is substantially equal to the threshold current. However, due to valve hysteresis, the rate of descent remains high and the negative position error value increases. As shown in FIG. 5, the lowering time would have been about 5.5 seconds if the actual current remained at the threshold value.

At time $T_3$, control circuit 64 detects that the error value is more negative than a predetermined value. Thereafter, the threshold value is decreased (line 504) until a change in the derivative of the sensed position signal (line 502) is detected at time $T_4$. This condition is detected, for example, when the magnitude of the position error value has not increased from the previous value. Between times $T_4$ and $T_5$, control circuit 64 uses the modified threshold value to determine the control signal. At time $T_5$, the implement has been fully lowered and the actual lowering current drops to zero. Thus, the modification of the threshold current increases the total lowering time from about 5.5 seconds to about 10 seconds.

Referring to FIG. 6, a line 600 represents the position command line generated when implement 44 is commanded to drop under conditions where the threshold value is not modified. In this example, the implement is commanded to drop at a rate category of "4" corresponding to 4.5 seconds for full range movement. The actual hitch position is shown by a line 602. The threshold current used to generate the control signal applied to the lower valve coil is represented by a line 604, and the current applied to the lower valve is represented by a line 606.

The situation represented by the graph of FIG. 6 differs from the situation represented by the graph of FIG. 5 principally because the error value does not become more negative than the predetermined value. Thus, the logic which modifies the threshold value is not invoked (as shown by line 604 being flat), and the position of implement 44 represented by line 602 tracks command line 600 with minimal deviation.

The difference between actual current lines 506 and 606 and threshold current lines 504 and 604 in FIGS. 5 and 6, when the error value is not positive, occurs because the actual current applied to the lower valve is compensated for voltage and temperature as described in U.S. Pat. No. 5,472,056, incorporated herein by reference. Analogous graphs to those of FIGS. 5 and 6 would show the operation of control system 46 when implement 44 is being raised.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the various flow charts only generally represent the steps used by the control system. Different hardware and software implementations that fall within the scope of the appended claims would be apparent to a person of skill in the art.

What is claimed is:

1. A system for controlling the position of an implement coupled to a work vehicle, the implement being moveable by a hydraulic positioning assembly comprising an actuator and a valve assembly configured to control the flow of fluid to and from the actuator in response to control signals, the valve assembly requiring control signals substantially equal to a first threshold value before fluid begins to flow, the system comprising:

a sensor configured to detect the position of the implement and to generate a signal representative thereof; and a control circuit coupled to the sensor and the valve assembly, the control circuit configured to generate the control signals applied to the valve assembly based upon the first threshold value in response to a change in a position command signal and, after detecting undesirable implement movement based upon a comparison of the sensed position signal and the position command signal, to generate the control signals based upon a modified threshold value.

2. The system of claim 1 wherein the valve assembly comprises a raise valve and a lower valve, and the control signals include a raise control signal and a lower control signal applied to the raise valve and the lower valve, respectively.

3. The system of claim 2 wherein the control signals are pulse-width-modulated signals and the rate of movement of the actuator is proportional to the duty cycle of the control signals.

4. The system of claim 1 wherein, when the control signals are based upon the first threshold value, the control circuit is configured to generate the control signals to include a component representing a desired rate of movement of the actuator.

5. The system of claim 4 further comprising an operator-adjustable rate of movement device configured to generate signals representing the desired rate of movement.

6. The system of claim 1 wherein the control circuit is configured to modify the threshold value upon detecting an excessive rate of implement movement.

7. A system for controlling the position of an implement coupled to a work vehicle, the implement being moveable by a hydraulic positioning assembly comprising an actuator and a valve assembly configured to control the flow of fluid to and from the actuator in response to control signals, the valve assembly requiring control signals substantially equal to a first threshold value before fluid begins to flow, the system comprising:

a sensor configured to detect the position of the implement and to generate a signal representative thereof; and a control circuit coupled to the sensor and the valve assembly, the control circuit configured to generate the control signals applied to the valve assembly based upon the first threshold value in response to a change in a position command signal and, after detecting undesirable implement movement based at least upon the sensed position signal, to generate the control signals based upon a modified threshold value; and wherein the control circuit is configured to determine an error value based upon the difference between the sensed position signal and the position command signal, and to detect undesirable implement movement when the error value becomes more negative than a predetermined value.

8. The system of claim 7 wherein the control circuit decreases the modified threshold value until the magnitude of the error value is no longer increasing.

9. A system for controlling the position of an implement coupled to a work vehicle, the implement being moveable by a hydraulic positioning assembly comprising an actuator and a valve assembly configured to control the flow of fluid to and from the actuator in response to control signals, the valve assembly requiring control signals substantially equal to a first threshold value before fluid begins to flow, the system comprising:

- a sensor configured to detect the position of the implement and to generate a signal representative thereof; and
- a control circuit coupled to the sensor and the valve assembly, the control circuit configured to generate the control signals applied to the valve assembly based upon the first threshold value in response to a change in a position command signal and, after detecting undesirable implement movement based at least upon the sensed position signal, to generate the control signals based upon a modified threshold value; and
- wherein the control circuit, after detecting undesirable implement movement, decreases the threshold value until a change in the derivative of the sensed position signal is detected.

10. A system for controlling the position of an implement coupled to a work vehicle, the implement being moveable by a hydraulic positioning assembly comprising an actuator and a valve assembly configured to control the flow of fluid to and from the actuator in response to control signals, the valve assembly requiring control signals substantially equal to a first threshold value before fluid begins to flow, the system comprising:

- a sensor configured to detect the position of the implement and to generate a signal representative thereof; and
- a control circuit coupled to the sensor and the valve assembly, the control circuit configured to generate the control signals applied to the valve assembly based upon the first threshold value in response to a change in a position command signal and, after detecting undesirable implement movement based at least upon the sensed position signal, to generate the control signals based upon a modified threshold value; and
- wherein, when the control signals are based upon the modified threshold value, the control circuit is configured to generate the control signals to substantially equal the modified threshold value.

11. A system for controlling the position of an implement coupled to a work vehicle, the implement being moveable by a hydraulic positioning assembly comprising an actuator and a valve assembly configured to control the flow of fluid to and from the actuator in response to control signals, the valve assembly requiring control signals substantially equal to a first threshold value before fluid begins to flow, the system comprising:

- a sensor configured to detect the position of the implement and to generate a signal representative thereof;
- an operator-adjustable command device configured to generate a position command signal; and
- a control circuit coupled to the sensor, the command device, and the valve assembly, the control circuit configured to determine an error value based upon a difference between the commanded position and the sensed position, to generate the control signals applied to the valve assembly based upon the first threshold value in response to a positive error value, and, if the error value becomes more negative than a predetermined value, to generate the control signals based upon a variable threshold value which is decreased until the magnitude of the error value no longer increases.

12. The system of claim 11 wherein the valve assembly comprises a raise valve and a lower valve, and the control signals include a raise control signal and a lower control signal applied to the raise valve and the lower valve, respectively.

13. The system of claim 12 wherein the control signals are pulse-width-modulated signals and the rate of movement of the actuator is proportional to the duty cycle of the control signals.

14. The system of claim 11 wherein, when the control signals are based upon the first threshold value, the control circuit is configured to generate the control signal to include a component representing a desired rate of movement of the actuator.

15. The system of claim 14 further comprising an operator-adjustable rate of movement device configured to generate signals representing the desired rate of movement.

16. The system of claim 11 wherein, when the control signals are based upon the variable threshold value, the control circuit is configured to generate the control signals to substantially equal the variable threshold value.

17. A method for controlling the position of an implement coupled to a work vehicle, the implement being moveable by a hydraulic positioning assembly comprising an actuator and a valve assembly configured to control the flow of fluid to and from the actuator in response to control signals, the valve assembly requiring control signals substantially equal to a first threshold value before fluid begins to flow, the method comprising the steps of:

(a) generating the control signals applied to the valve assembly based upon the first threshold value in response to a change in a commanded position;

(b) detecting undesirable implement movement based upon a comparison between a sensed position signal and the commanded position; and (c) upon detecting undesirable implement movement, modifying the threshold value used to generate the control signal until control is achieved.

18. The method of claim 17 wherein the valve assembly comprises a raise valve and a lower valve, and the control signals include a raise control signal and a lower control signal applied to the raise valve and the lower valve, respectively.

19. The method of claim 17 wherein, in step (a), the control signal includes a component representing a desired rate of movement of the actuator.

20. A method for controlling the position of an implement coupled to a work vehicle, the implement being moveable by a hydraulic positioning assembly comprising an actuator and a valve assembly configured to control the flow of fluid to and from the actuator in response to control signals, the valve assembly requiring control signals substantially equal to a first threshold value before fluid begins to flow, the method comprising the steps of:

(a) generating the control signals applied to the valve assembly based upon the first threshold value in response to a change in a commanded position;

(b) detecting undesirable implement movement; and (c) upon detecting undesirable implement movement, modifying the threshold value used to generate the control signal until control is achieved; and wherein, in step (b), undesirable implement movement is detected when an error value determined based upon the difference between the sensed position signal and the commanded position becomes more negative than a predetermined value.

21. The method of claim 17 wherein step (b) comprises the steps of determining a rate of implement movement based upon changes in a sensed position signal and comparing the rate of implement movement to a predicted rate, wherein undesirable implement movement is detected based upon a predetermined relationship therebetween.

22. A method for controlling the position of an implement coupled to a work vehicle, the implement being moveable by a hydraulic positioning assembly comprising an actuator and a valve assembly configured to control the flow of fluid to and from the actuator in response to control signals, the valve assembly requiring control signals substantially equal to a first threshold value before fluid begins to flow, the method comprising the steps of:

(a) generating the control signals applied to the valve assembly based upon the first threshold value in response to a change in a commanded position;

(b) detecting undesirable implement movement; and (c) upon detecting undesirable implement movement, modifying the threshold value used to generate the control signal until control is achieved; and wherein, in step (c), the control signal substantially equals the modified threshold value.

* * * * *